(12) United States Patent
Blonski

(10) Patent No.: US 11,337,550 B2
(45) Date of Patent: May 24, 2022

(54) SYSTEM FOR DETECTING A POSSIBILITY OF BOILING OVER AND PREVENTING SAID BOILING OVER, COMMUNICABLE WITH A COOKTOP

(71) Applicant: ADVANCED DIGITAL BROADCAST S.A., Bellevue (CH)

(72) Inventor: Pawel Blonski, Zielona Gora (PL)

(73) Assignee: ADVANCED DIGITAL BROADCAST S.A., Bellevue (CH)

( * ) Notice: Subject to any disclaimer, the term of this patent is extended or adjusted under 35 U.S.C. 154(b) by 237 days.

(21) Appl. No.: 16/568,327

(22) Filed: Sep. 12, 2019

(65) Prior Publication Data

US 2020/0077837 A1    Mar. 12, 2020

(30) Foreign Application Priority Data

Sep. 12, 2018    (EP) ..................................... 18194130

(51) Int. Cl.
| | |
|---|---|
| *A47J 27/56* | (2006.01) |
| *A47J 36/32* | (2006.01) |
| *A47J 27/62* | (2006.01) |
| *A47J 36/12* | (2006.01) |
| *B01B 1/00* | (2006.01) |
| *A47J 27/21* | (2006.01) |

(52) U.S. Cl.
CPC .......... *A47J 36/32* (2013.01); *A47J 27/21175* (2013.01); *A47J 27/56* (2013.01); *A47J 27/62* (2013.01); *A47J 36/12* (2013.01); *A47J 36/321* (2018.08); *B01B 1/00* (2013.01); *A47J 27/21066* (2013.01)

(58) Field of Classification Search
CPC ............ A47J 27/21058; A47J 27/21066; A47J 27/21158; A47J 27/21166; A47J 27/21175; A47J 27/21183; A47J 27/56; A47J 36/06; A47J 36/12
USPC ........................................... 126/383.1, 384.1
See application file for complete search history.

(56) References Cited

U.S. PATENT DOCUMENTS

| | | | |
|---|---|---|---|
| 2004/0144259 A1* | 7/2004 | Kim ..................... | A47J 45/063 99/339 |
| 2016/0088971 A1* | 3/2016 | Lagerlof ................. | A47J 27/56 700/299 |
| 2020/0029743 A1* | 1/2020 | Sudhir ................. | H05B 6/6473 |

* cited by examiner

*Primary Examiner* — Reginald Alexander
(74) *Attorney, Agent, or Firm* — Mark M. Friedman

(57) ABSTRACT

A system for detecting a possibility of boiling over and preventing said boiling over comprising a vessel having a vessel's lid, the lid being characterised in that it is configured to: receive information on an initial level of the vessel's content and current level of the vessel's content; and establish on which heating section of a particular cooktop the vessel and the lid are positioned; and based on a difference between the initial level and the current level as well as the time of the creation of said difference: the lid is configured to instruct a height actuator of the lid to extend said lid vertically, in order to extend height of said vessel, and the lid is configured to instruct an aperture actuator to create an aperture in the lid's; the lid is configured to communicate with said cooktop in order to decrease power generation on said heating section.

8 Claims, 17 Drawing Sheets

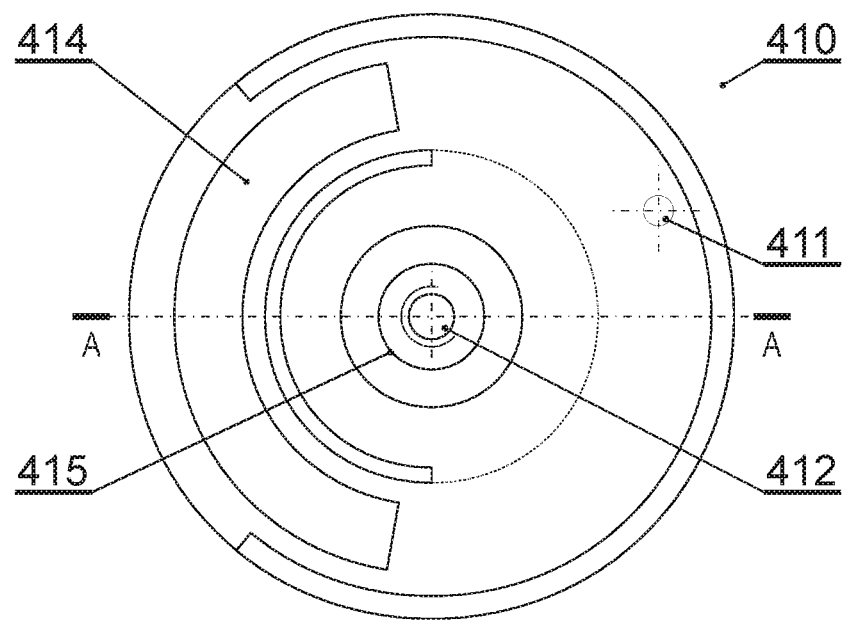
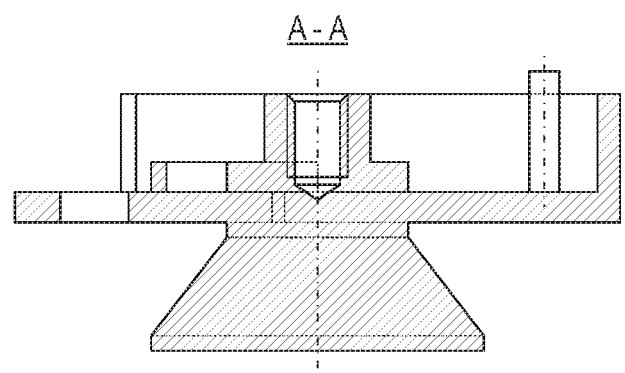
Fig. 5B
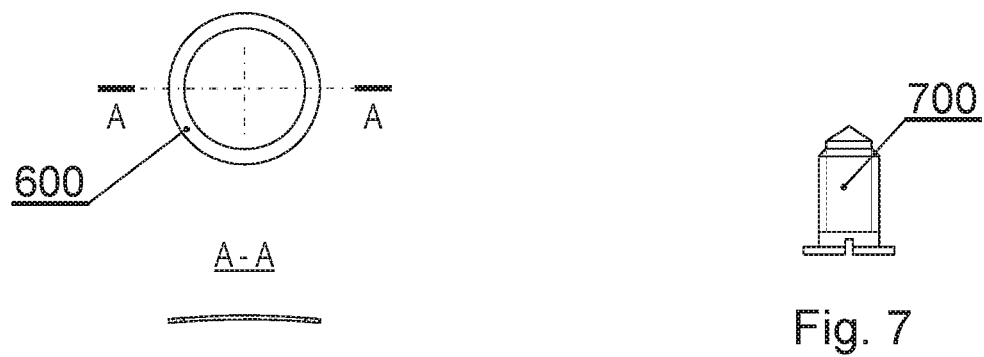
Fig. 6
Fig. 7

SYSTEM FOR DETECTING A POSSIBILITY OF BOILING OVER AND PREVENTING SAID BOILING OVER, COMMUNICABLE WITH A COOKTOP

TECHNICAL FIELD

The present invention relates to a lid for a cooking vessel. In particular, the present invention relates to a lid that detects and prevents boiling over situation that may result in staining or even damaging the cooking vessel, a cooktop or a kitchen cabinet or ultimately kitchen's floor.

BACKGROUND OF THE INVENTION

Boiling over is a situation when a liquid (or vessel's content in general), that is being heated, rises up and flows over the edge of the cooking vessel.

Typically, in any cooking vessel having a lid, during cooking near the boiling point of food present in said vessel (for example pasta etc.), foam may form, which may spill over the edge of said vessel, displacing the lid and causing the contents of said vessel to overflow down its sides of the outer walls and further onto a cooktop.

Said foam rises mainly because of the presence of the lid, which prevents normal venting and cooling of the boiling surface. On the other hand, such lid is beneficial in order to keep the heat inside said vessel as it reduces energy use, and shortens boiling time.

Thus, it is frequently required to personally, supervise the cooking constantly in order to detect a possibility of boiling over and preventing said boiling over. This in turn is inconvenient. Sometimes boiling over is so rapid, that even if a person is present in the kitchen, the person may still miss the beginning of the boiling over process.

As a solution, some lids provide a small aperture (diameter in a range of few millimeters) in the lid to let excess pressure escape via the aperture. However, a small aperture sufficient to decrease pressure will not be sufficient to prevent boiling over.

Prior art defines "A cooking vessel for an induction cooktop" EP3226650A1, which discloses a cooking vessel comprising at least one movable magnetic material base plate provided at heat conducting zone of the cooking vessel, wherein the movable magnetic material base plate transfers heat from the induction cooktop to contents in the cooking vessel.

The cooking vessel further comprises at least one non-magnetic material base plate, placed adjacent to the at least one movable magnetic material base plate, wherein the non-magnetic material base plate blocks transfer of heat from induction cooktop to the contents. Further, an insulation pocket, placed adjacent to the at least one movable magnetic material base plate, is configured to house the at least one movable magnetic material base plate. Furthermore, an actuator is configured to displace the at least one movable magnetic material base plate from the heat conducting zone to the insulation pocket based on a control signal.

Therefore, the solution of EP3226650A1 is limited to induction cooktops and at the same time results in wasting energy, because the cooktop still operates at the previous power, while the vessel is prevented from transferring this power to the food being prepared.

It would be advantageous to present a solution that would be more efficient at preventing boiling over, would be more energy efficient and will be applicable to all types of cooktops.

The aim of the development of the present invention is an improved and cost effective method and system for detecting a possibility of boiling over and preventing said boiling over.

SUMMARY AND OBJECTS OF THE PRESENT INVENTION

There is disclosed a system for detecting a possibility of boiling over and preventing said boiling over comprising a vessel (101) having a vessel's lid (102), the lid (102) being characterised in that it is configured to: receive information on an initial level of the vessel's content and current level of the vessel's content; and establish on which heating section (135) of a particular cooktop (107) the vessel (101) and the lid (102) are positioned; and based on a difference between the initial level and the current level as well as the time of the creation of said difference: the lid (102) is configured to instruct, by means of a controller (203), a height actuator (207) of the lid (102) to extend said lid (102) vertically, in order to extend height of said vessel (101); and the lid (102) is configured to instruct, by means of a controller (203), an aperture actuator (206) to create an aperture in the lid's (102) top in order to facilitate exchange of heat; the lid (102) is configured to communicate (201) with said cooktop (107) in order to decrease power generation on said heating section (135).

Preferably, said height actuator (207) extends said height of the lid by means of a spring or an electric motor.

Preferably, said aperture actuator (206) creates said aperture of the lid by means of a spring or an electric motor.

Preferably, said height actuator (207) comprises a release mechanism configured to extend a flange (1005) between the lid's (102) bottom portion (1100) and the lid's (102) top portion.

Preferably, a content level sensor (202), providing said information on level of the vessel's content, is submersible in the vessel's content and mounted on an extensible, multi-segment support (1104).

Preferably, said establishing step employs a proximity identification circuit of said lid (102).

Preferably, said controller (203) is configured to communicate via a communication module (201) with a mobile device (104) in order to report to the mobile device (104), information regarding whether a boiling over situation has been prevented or not.

Preferably, said communication module (201) operated according to the Bluetooth or ZigBee protocol.

There is also disclosed a method for detecting a possibility of boiling over and preventing said boiling over in a vessel (101) covered with a lid (102), said method being characterised in that it comprises the step of: detecting (301) an initial content level by a sensor (202); detecting (302) a current content level by a sensor (202); establishing on which heating section (135) of a particular cooktop (107) the vessel (101) and the lid (102) are positioned; verifying (303) whether a predefined threshold has been met (303) between said initial and current content level; when said threshold has been met, invoking (306) a height actuator (207) of the lid (102) to extend said lid (102) vertically, in order to extend height of said vessel (101), and at the same time communicating (201) with said cooktop (107) in order to decrease power generation on said heating section (135).

Preferably, after the level threshold condition has been met, the system executes a step of awaiting (304) a time threshold condition (304) between said initial and current content level.

Preferably, the method further comprises the steps of: waiting for a predefined threshold of time and verifying (307) whether the content level still rises and in case it does invoking an aperture actuator (308) configured to create an aperture in the lid's (102) top in order to facilitate exchange of heat; awaiting (309) a content level decrease threshold condition to be met and in case it is met: closing the aperture actuator (310) thereby closing said aperture; and closing the height actuator (311) thereby decreasing back said extended height of the lid (102); and returning the heating power to its original setting, by communicating such request to said cooktop (107).

Preferably, said establishing step comprises the steps of: establishing (321) a communication between the lid (102) and said cooktop (107); communicating (322) identifiers both ways such that the lid (102) is aware of the cooktop's identifier (107) and vice versa; based on exchanged data, establishing (323A, 323B) a correspondence between said lid (102) and said heating section (135) of the cooktop (107).

Another object of the present invention is a computer program comprising program code means for performing all the steps of the computer-implemented method according to the present invention when said program is run on a computer.

Another object of the present invention is a computer readable medium storing computer-executable instructions performing all the steps of the computer implemented method according to the present invention when executed on a computer.

BRIEF DESCRIPTION OF THE DRAWINGS

These and other objects of the invention presented herein, are accomplished by providing a system for detecting a possibility of boiling over and preventing said boiling over. Further details and features of the present invention, its nature and various advantages will become more apparent from the following detailed description of the preferred embodiments shown in a drawing, in which:

FIG. 5A-B show an external portion of the gripping element;

FIG. 6 presents a pad;

FIG. 7 depicts a fastening element;

NOTATION AND NOMENCLATURE

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

A computer-readable (storage) medium, such as referred to herein, typically may be non-transitory and/or comprise a non-transitory device. In this context, a non-transitory storage medium may include a device that may be tangible, meaning that the device has a concrete physical form, although the device may change its physical state. Thus, for example, non-transitory refers to a device remaining tangible despite a change in state.

As utilized herein, the term "example" means serving as a non-limiting example, instance, or illustration. As utilized herein, the terms "for example" and "e.g." introduce a list of one or more non-limiting examples, instances, or illustrations.

DESCRIPTION OF EMBODIMENTS

Figure 1:
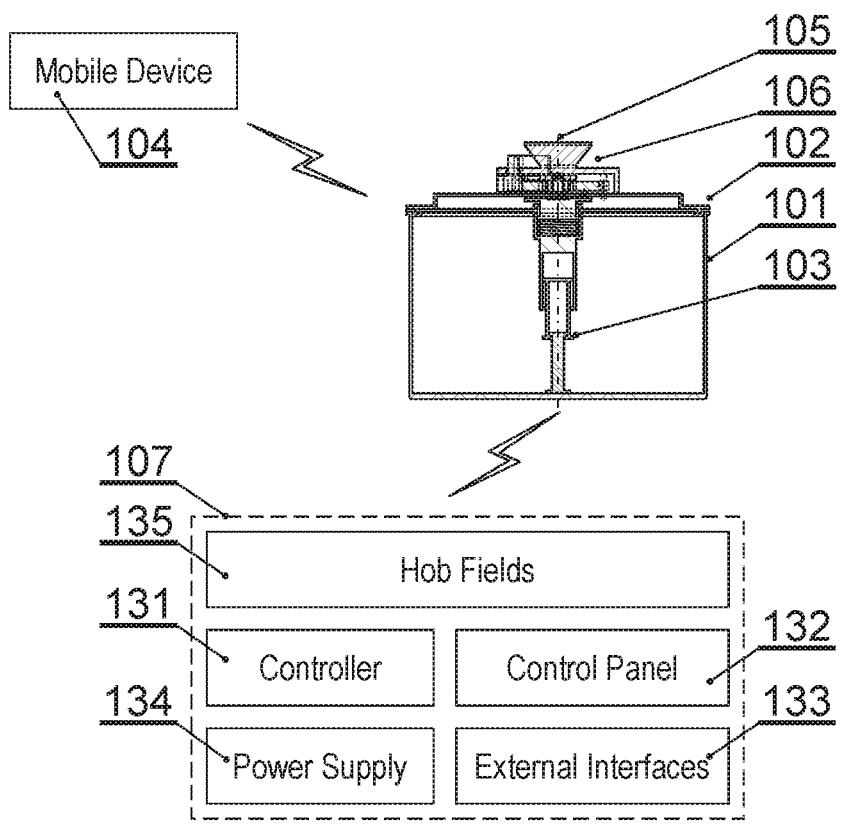
FIG. 1 presents a general diagram of the system according to the present invention.

FIG. 1 presents a diagram of the system according to the present invention. This is a general overview wherein the system comprises a vessel (101) a vessel's lid (102), the lid being configured to receive information on an initial level of the vessel's content and current level of the vessel's content and based on a difference between the initial level and the current level as well as the time of the creation of said difference, the lid being configured to instruct a raising mechanism of the lid to extend said lid vertically and at the same time the lid being configured to instruct an actuator to create an aperture in the lid's top in order to let cooler air inside the vessel (101).

Further, the lid (102) and/or the vessel (101) may comprise a set of sensors (103), adaptable to said vessel (101), configured to detect an initial level of the vessel's content and a current level of the vessel's content.

Additionally, the lid (102) may communicate with a cooktop (107) in order to determine its current settings and to change these settings in case there is a need to do so, based on current cooking parameters. To this end, the cooktop (107) may comprise one or more heating fields/areas (135), a suitable controller (131, 132) and communication interfaces (133).

Lastly, the lid (102) may communicate with a mobile device (104) in order to notify such device of actions taken and possible hazards.

The lid (102) preferably comprises an electronic and/or mechanical circuit (106) positioned under its grip section (105).

Figure 2:
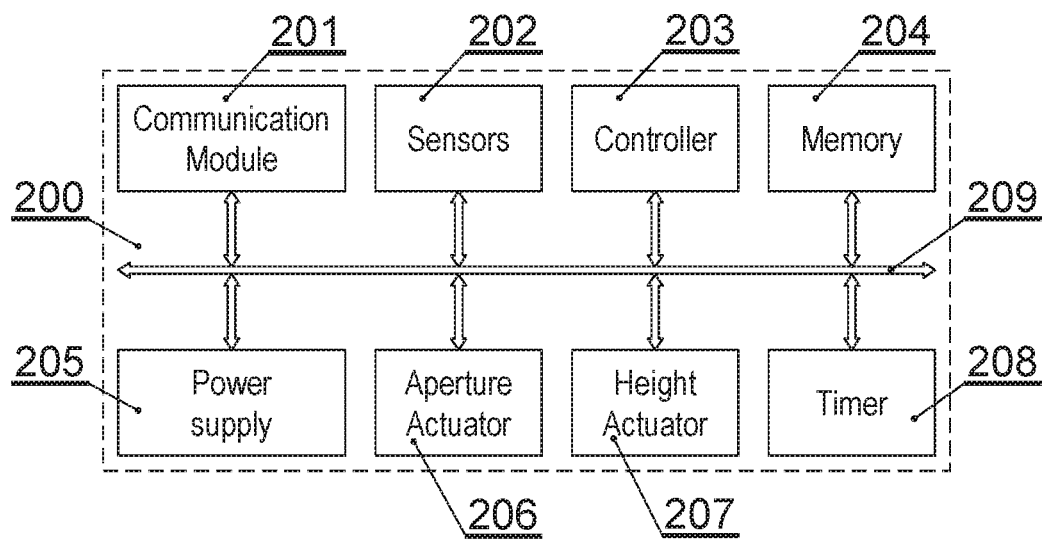
FIG. 2 presents a block diagram of the system according to the present invention.

FIG. 2 presents a block diagram of the system (200) according to the present invention. The system may be realized using dedicated components and/or custom made FPGA or ASIC circuits. The system comprises a data bus (209) communicatively coupled to a memory (204). Additionally, other components of the system are communicatively coupled to the system bus (209) so that they may be managed by a controller (203).

The memory (204) may store computer program or programs executed by the controller (203) in order to execute steps of the method according to the present invention.

The system is preferably powered up by a power supply such as a battery (205), since this is most convenient for users and allows for electromechanical solutions allowing fully automatic operation.

First, the controller (203) is configured to communicate with a sensors module (202) configured to detect an initial level of the vessel's content and current level of the vessel's content. Different sensors may be employed for this purpose such as proximity sensors of reflective light sensors.

In any event, the controller (203) is configured to obtain from the sensors (202) and store in the memory (204) the initial level of the vessel's content and subsequently sample the current state of the sensors (202) in order to determine whether the current level of the vessel's content is different than the initial level of the vessel's content.

It is irrelevant in principle how said sensors (202) are physically organised as long as the system may determine the initial level and the current level of the vessel's content. Examples of an extensible sensors system will be presented with reference to subsequent figures.

Additionally, the determination of a difference between the initial level and the current level of the vessel's content may be associated with time of creation of said difference. To this end, the system (200) may comprise a timer module (208) configured to provide a time reference that may be compared between different data sampling moments.

In response to the determined difference, the system instructs an aperture actuator (206) and/or a height actuator (207) to execute their/its task. The task of the height actuator is to increase the height of the corresponding lid (102) while the task of the aperture actuator is to make an aperture in said lid (102). These functions may operate independently, for example the system may monitor whether the level of the vessel's content still rises after the height actuator (207) has been executed and in the response the aperture actuator (206) may be executed.

Different embodiments of said aperture actuator (206) and/or said height actuator (207) may be provided as will be evident from the subsequent figures and description.

In general, invoking said height actuator (207) results in increasing the height of the lid (102) while invoking said aperture actuator (206) results in creating an aperture in the lid (102) (different kinds of such apertures and different sizes may be applied), via which hot air may escape from the vessel (101), on which said lid (102) is positioned. More generally, said aperture in the lid's (102) top is created in order to facilitate exchange of heat between the internal volume of said vessel (101) and the outside air.

Said height extension may be in a range of several centimetres depending on the needs and the diameter of the lid (for example larger lids may extend by a greater length).

Lastly, the aforementioned controller (203) may be configured to communicate via a communication module (201) (e.g. Bluetooth, ZigBee) with the cooktop (107) and/or with the mobile device (104). Communication with the cooktop (107) may be beneficial to decrease or switch off power generation in order to prevent boiling over.

In some embodiments, the system (200) may comprise a proximity identification circuit e.g. NFC making it possible for a cooktop (107) to apply power adjustment instructions to a particular heating section. To this end the cooktop (107) may comprise similar proximity sensors allowing to match detected sensors (such as sensors of the system (200)) in proximity to given proximity sensors of particular heating sections. Thus, the cooktop (107) may be aware which system (200) is paired with which heating section.

Communication with the mobile device (104) is beneficial because the system (200) may communicate, to said mobile device (104), information regarding whether a boiling over situation has been prevented or not. To this end, additional sensor may be present that reports whether boiling over has actually occurred. Typically, it will be a proximity sensor configured to detect boiling foam or a humidity sensor able to detect submersion in boiling foam.

In some embodiments it may be required to pair a given mobile device (104) with a given system (200). In other embodiments notifications such as SMS or e-mail or similar may be communicated.

Figure 3A:
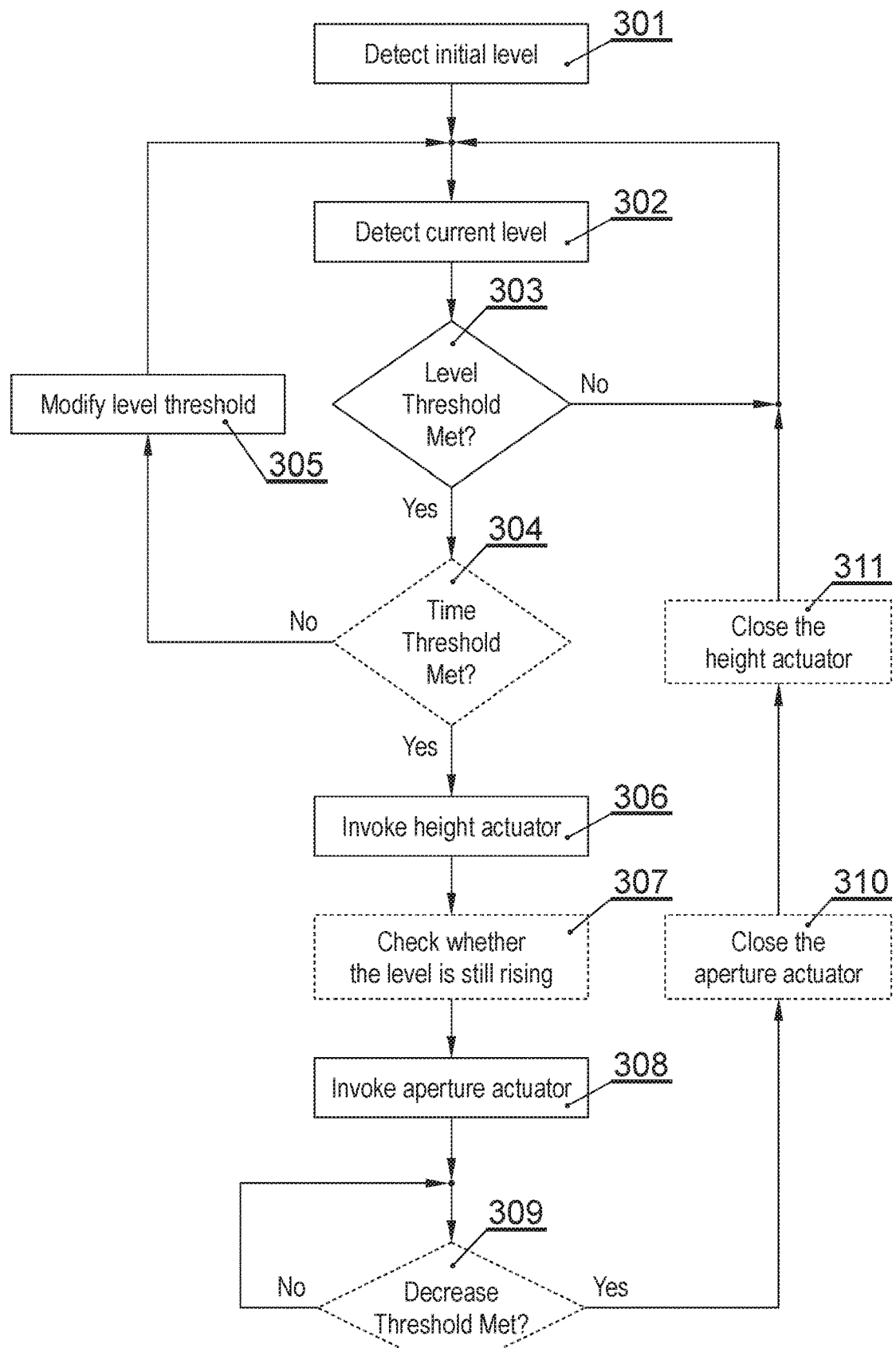
FIG. 3A presents a block diagram of the method according to the present invention.

FIG. 3A presents a block diagram of the method according to the present invention. The method starts from step (301) where the system is initiated, typically be detecting an initial level by said sensors module (202). If the initial level is not detected, the system assumes that the lid (102) is not present on a cookware comprising cooking content.

Additionally, it may be established on which heating section (135), of a particular cooktop (107), the vessel (101) and the lid (102) are positioned. Specific examples of such establishing step will be provided with reference to FIG. 3B.

In another case, when all sensors (202) detect vessel's content, it may indicate that the level of content in the vessel (101) is too high and the system (200) may indicate an alarm by suitable means such as appropriate notification to a mobile device (104) and/or notification of a cooktop (107) in order to prevent heating and/or invoking other audio and/or visual alarm supplied with power from the power supply (205).

The initiation may be automatic, for example in response to detection of a new initial level after a lack of signal detection by the respective sensor. Alternatively, the system may comprise an on/off switch for manual activation.

Next at step (302) a current level monitoring loop starts aimed at checking whether the level of vessel's content rises. To this end, the system verifies whether a predefined threshold has been met (303), for example the content level has risen by 2 or 3 cm.

In case the threshold condition has not been met, the process returns to step (302). Otherwise, an optional time threshold may be verified (304). This allows not to waste energy due to reacting too soon to potential boiling over situation. In other words, the shorter the time, the quicker the reaction must be. Therefore, it is beneficial to analyze both the level threshold and the time threshold in order to achieve the best results. For example, in case the previous level threshold has been met and the time threshold has not been met, the level threshold may be increased temporarily (305) in order to adapt to the current conditions and delay signaling detection of a potential boiling over.

When said level threshold and optional time thresholds have been met, the system assumes a boiling over possibility and at step (306) invokes the height actuator (207). At the same time, the system may communicate with said cooktop (107) in order to decrease power generation on said heating section (135). Optionally, said power decrease may be gradual (followed by period(s) of verifying its influence on the system) or significant at once in order to quickly achieve a desired boiling over prevention.

When the height actuator (207) has been invoked, the system may wait for a predefined threshold of time and optionally verify (307) whether the level still rises before invoking said aperture actuator (308).

Alternatively, in yet another embodiment, both the height actuator (207) and the aperture actuator (206) may be invoked substantially simultaneously.

At this time, the system may further instruct the cooktop (107) to decrease the heating power.

In case of mechanical actuators (206, 207), which are not configured to automatically return to their initial position, this is a step when the process ends.

Otherwise, in case of mechanical actuators (206, 207), which are configured to automatically return to their initial position, the system may carry out optional step (309-311).

At step (309) the system (200) may await a level decrease threshold condition to be met. It may for example be a decrease below said threshold of step (303) or a differently specified threshold.

In case the level decrease threshold condition has been met, the system may close the aperture actuator (310) and close said aperture, for example using a suitable electrical mechanism. Similarly, the heating power may be returned to its original setting, when the system communicates such request to said cooktop (107). Optionally, said power increase may be gradual.

Similarly, in case the level decrease threshold condition has been met, the system may close the height actuator (311) and decrease back said extended height of the lid (102), for example using a suitable electrical mechanism.

Figure 3B:
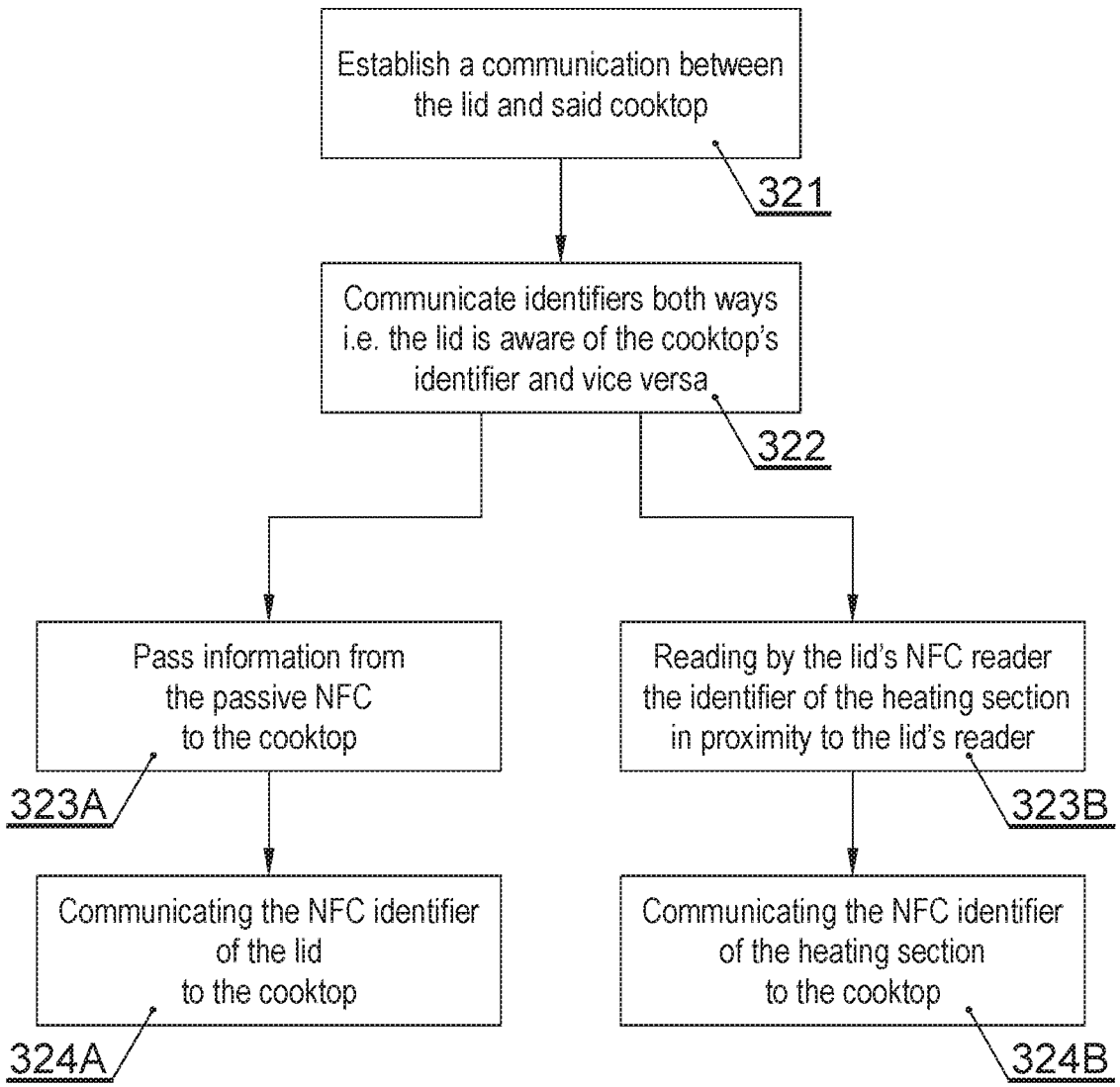
FIG. 3B depicts establishing a correspondence between a lid and a heating section of a cooktop.

FIG. 3B depicts examples of establishing a correspondence between a lid (102) and a heating section of a cooktop (107). At step (321) a communication is established between the lid (102) and said cooktop (107). This may be effected using the aforementioned Bluetooth, ZigBee or similar short-range wireless protocols.

Next, at step (322) identifiers are communicated, preferably both ways i.e. the lid is made aware of the cooktop's identifier and vice versa.

It is up to the designer of the lid (102) how a correspondence between the lid (102) and a particular heating section (135) of the cooktop (107) is established. Different approaches may be employed that will typically use a kind of proximity sensing method.

In case of a passive NFC in the lid (102), at step (323A) the information from the passive NFC may be passed to the cooktop (107) which has a suitable NFC reader in proximity to each of its heating section. In such a case, a pairing is only known to the cooktop but not to the lid, which only provides required information.

Alternatively, the lid (102) may comprise an NFC reader while each heating section (135) of the cooktop (107) comprises a passive NFC allowing to differentiate between said heating sections.

At step (323B) the lid (123) may read the identifier of the heating section (135) in proximity to the lid's reader.

Therefore, there are presented two ways of establishing a correspondence between a lid and a heating section of a cooktop. In general, based on exchanged data, there is established (323A, 323B) a correspondence between a lid and a heating section (135) of a cooktop (107).

In case of the option (323A) the NFC identifier of the lid is communicated (324A) to the cooktop while in the option (323B) the NFC identifier of the heating section is communicated (324B) to the cooktop.

FIGS. 4A-D show an internal portion of a gripping element (400). It comprises an opening (402) for receiving a mandrel (415). Further, the internal portion of the gripping element (400) comprises a lock release element (401) for releasing the aforementioned aperture in said lid (102).

Additionally, on its periphery, the internal portion of the gripping element (400) comprises a flange (403) guided by a flange guide (404). The flange (403) is configured to open or close a suitable aperture in the lid (102) and may have different shapes and sizes depending on the needs and the corresponding aperture of the lid (102).

Figure 4A:
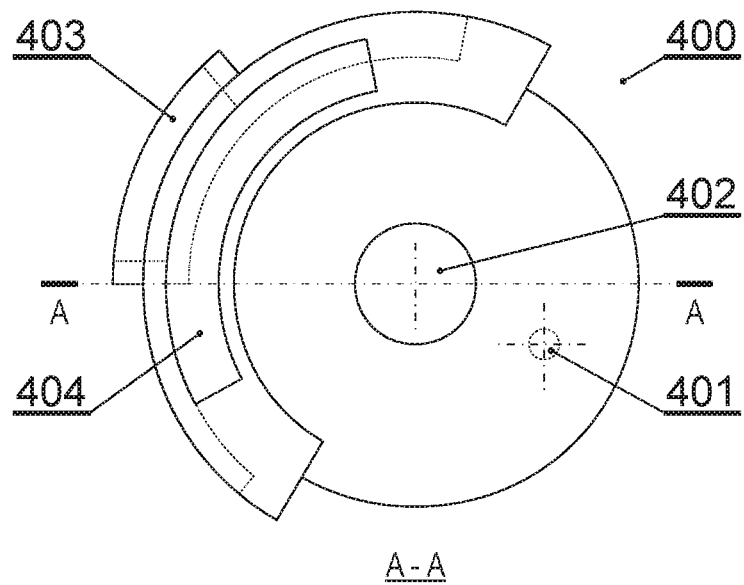
FIGS. 4A-D show an internal portion of a gripping element.
Figure 4A:
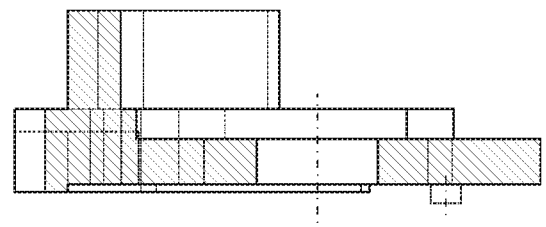
Figure 4B:
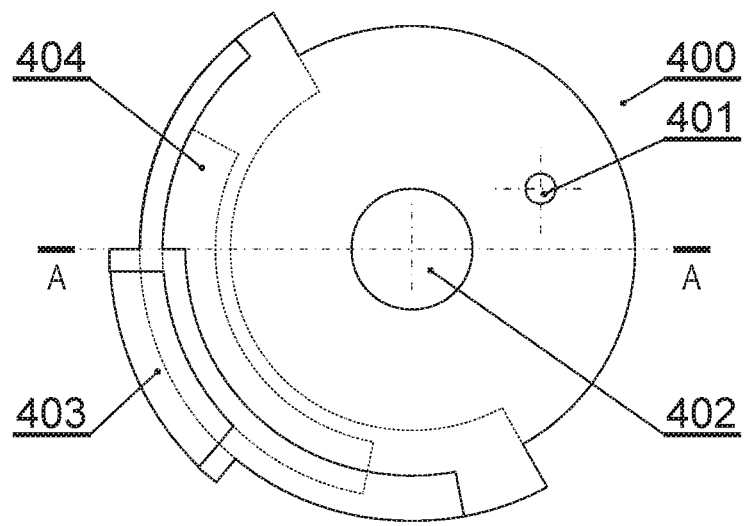
Figure 4B:
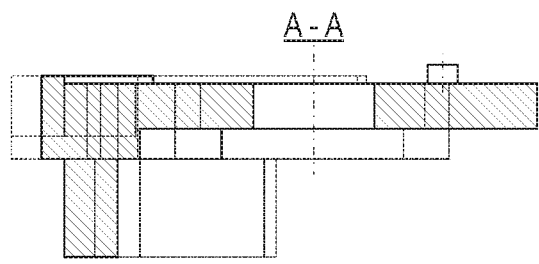
Figure 4C:
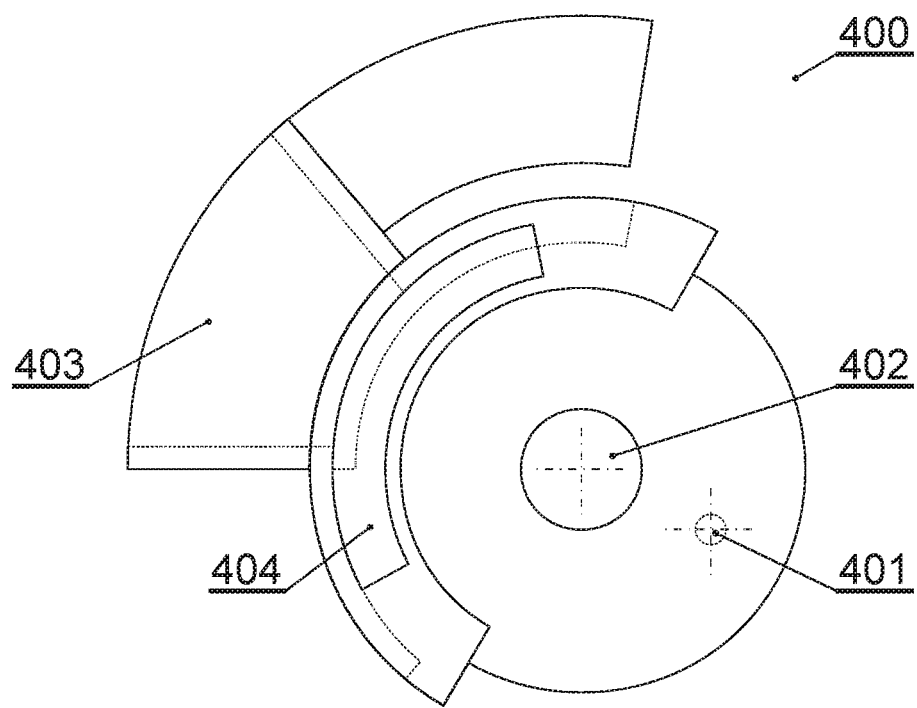
Figure 4D:
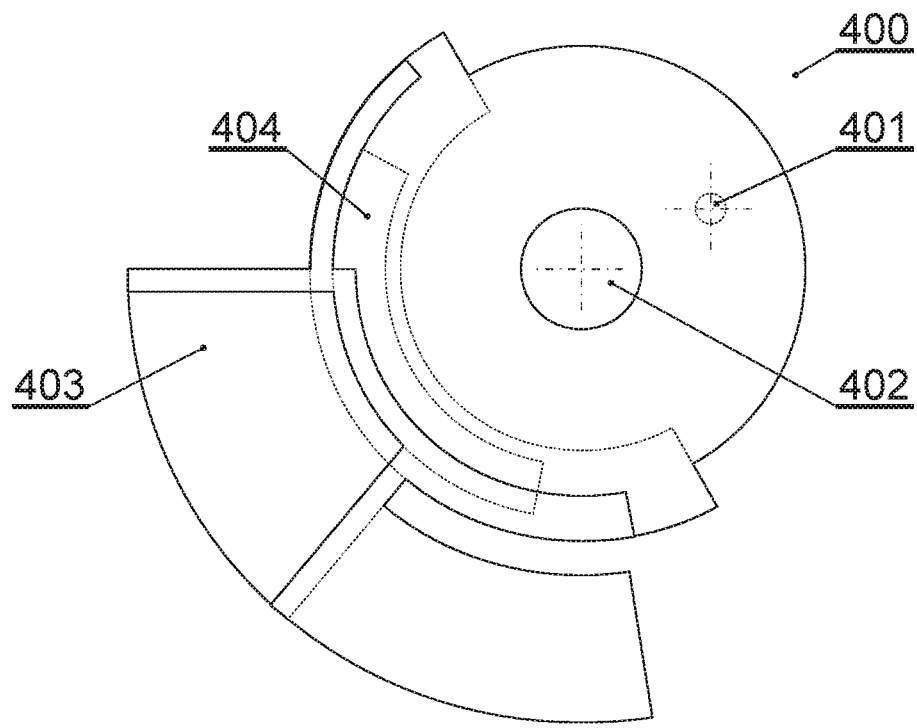

FIG. 4A shows a top view of the internal portion of a gripping element (400) while FIG. 4B shows a bottom view of the internal portion of a gripping element (400). FIGS. 4C-D are similar to FIGS. A-B pair with a difference in the size of the flange (403).

Figure 5A:
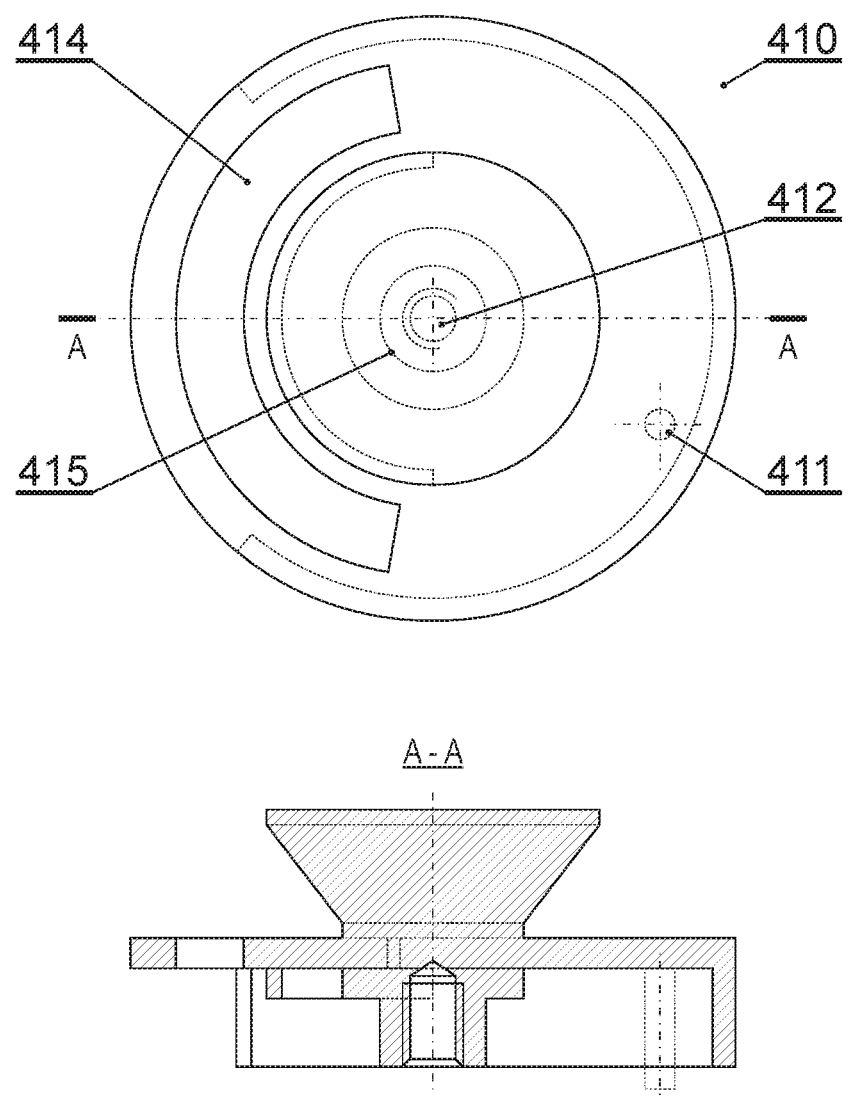

FIG. 5A-B show an external portion of the gripping element (410), which has a flange guide (414) and which has a similar shape as the flange guide (404). The external portion of the gripping element (410) has a threaded opening (412) configured to receive a mounting element having a corresponding thread portion. Lastly, the external portion of the gripping element (410) comprises a blocking member (411) (for example a protrusion), or other suitable mechanism such as a latch, for securing the external portion of the gripping element (410) to the lid (102).

FIG. 6 shows a pad (600) to be positioned between the internal portion of a gripping element (400) and the external portion of the gripping element (410) to be mounted on the lid's (102) top portion by means of a fastening element (for example a screw (700)) shown in FIG. 7.

Figure 8A:
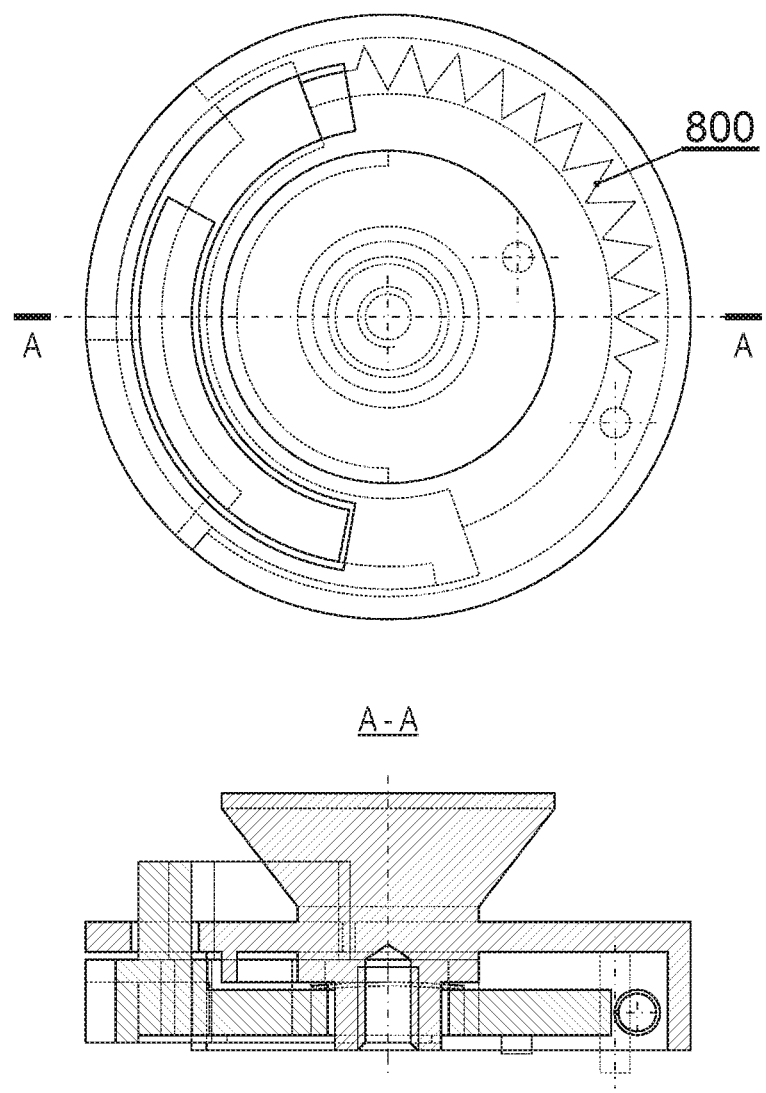
FIG. 8A presents a combined view of elements shown from FIG. 4A to FIG. 6 in a closed position.

FIG. 8A presents a combined view of elements shown from FIG. 4A to FIG. 6 wherein the combined element is in its closed position i.e. when the aperture of the corresponding lid (102) is closed and the aperture actuator (206) is ready to be invoked.

Figure 8B:
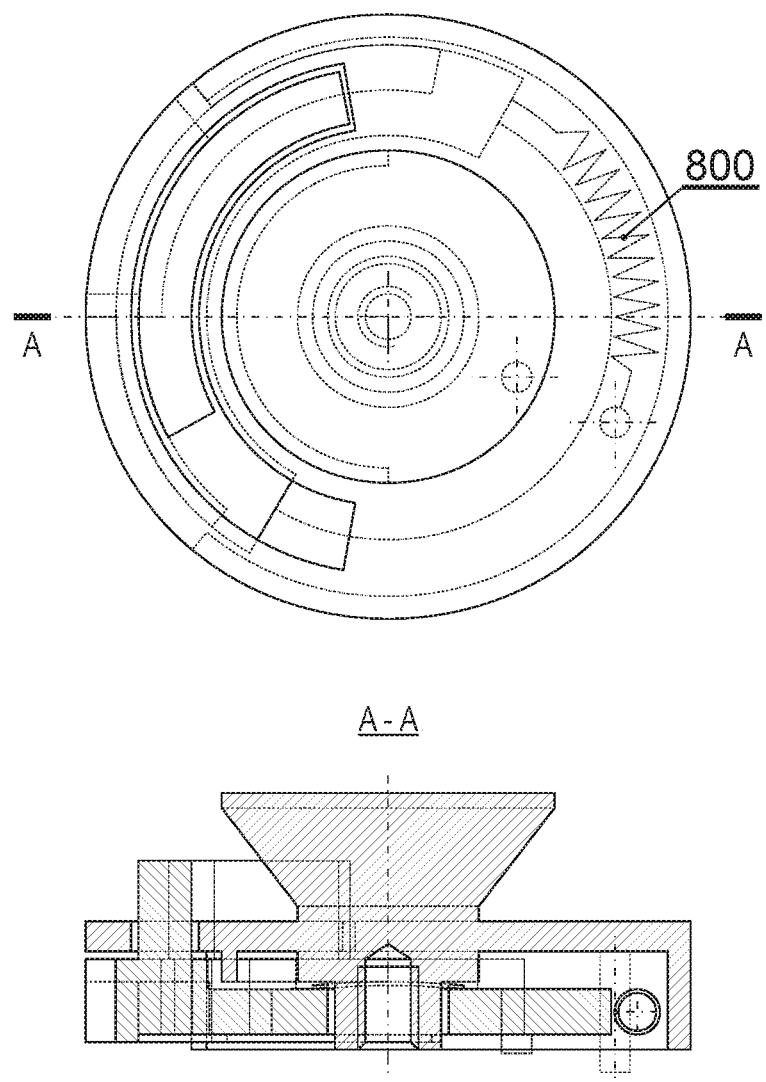
FIG. 8B presents a combined view of elements shown from FIG. 4A to FIG. 6 in an open position.

Correspondingly, FIG. 8B presents the same combined element but in an open position after the aperture actuator (206) has been invoked. Cross-sections have also been presented with the respective FIGS. 8A-B.

FIG. 8A-B present a mechanical solution wherein the movement of the flange (403) in the flange guide (414) does not require electrical force to be applied but rather the force required to move the flange (403) is effected by means of a spring (800). In order to keep clarity and readability of the drawings, the spring (800) has been shown only in FIGS. 8A-B.

Figure 9A:
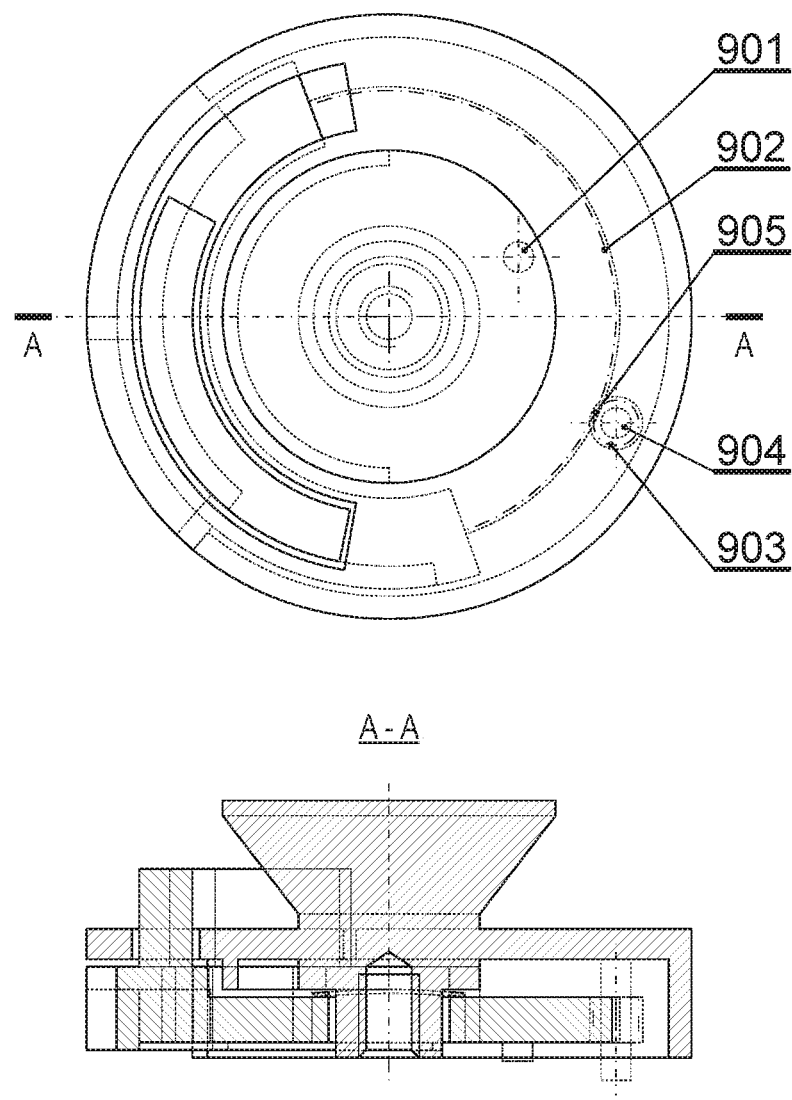
FIGS. 9A-B present a solution with an electric motor.
Figure 9B:
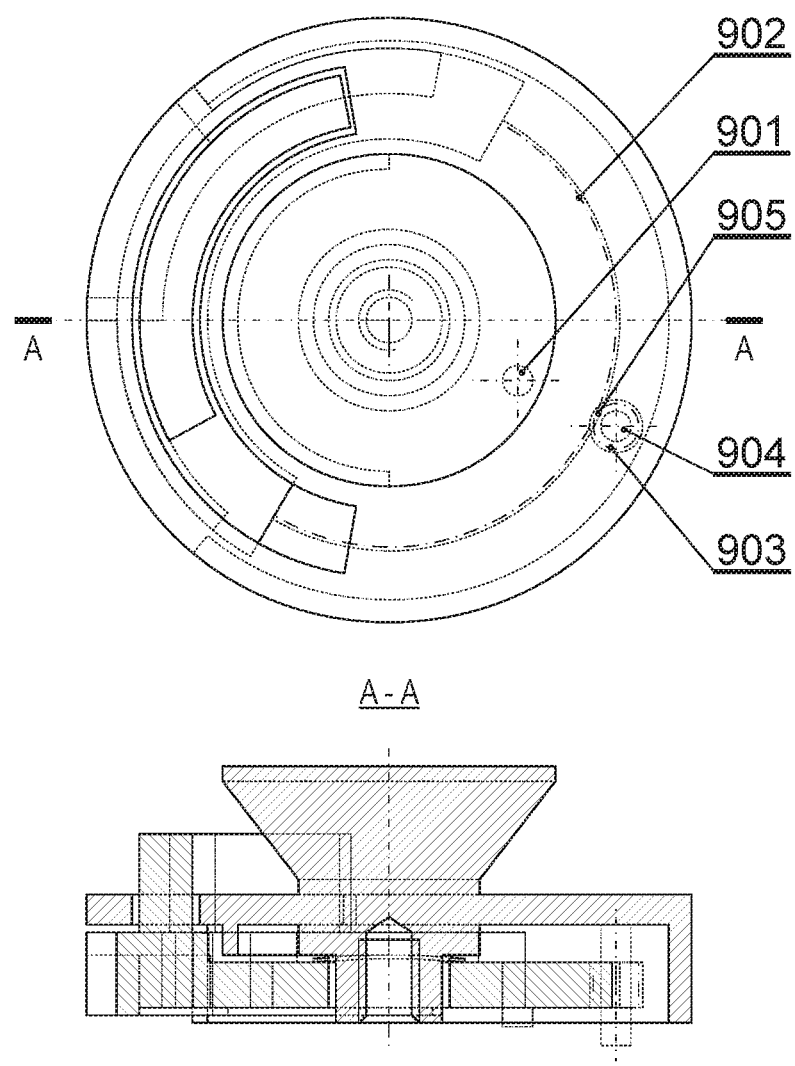

FIGS. 9A-B present a solution similar to the solution of FIGS. 8A-B with a difference in that instead of a spring mechanism (800), an electric motor is used, which is supplied with power from the power supply (205).

The grip section (105) has in this embodiment a gearwheel (902) configured to operate with a gearwheel (903) rotatably controlled by an electric engine (904) whereby forming a gear (905). A micro-switch (901) may be employed to control said electric engine (904).

Similarly, appropriate cross-sections have also been presented with the respective FIGS. 9A-B.

Figure 10A:
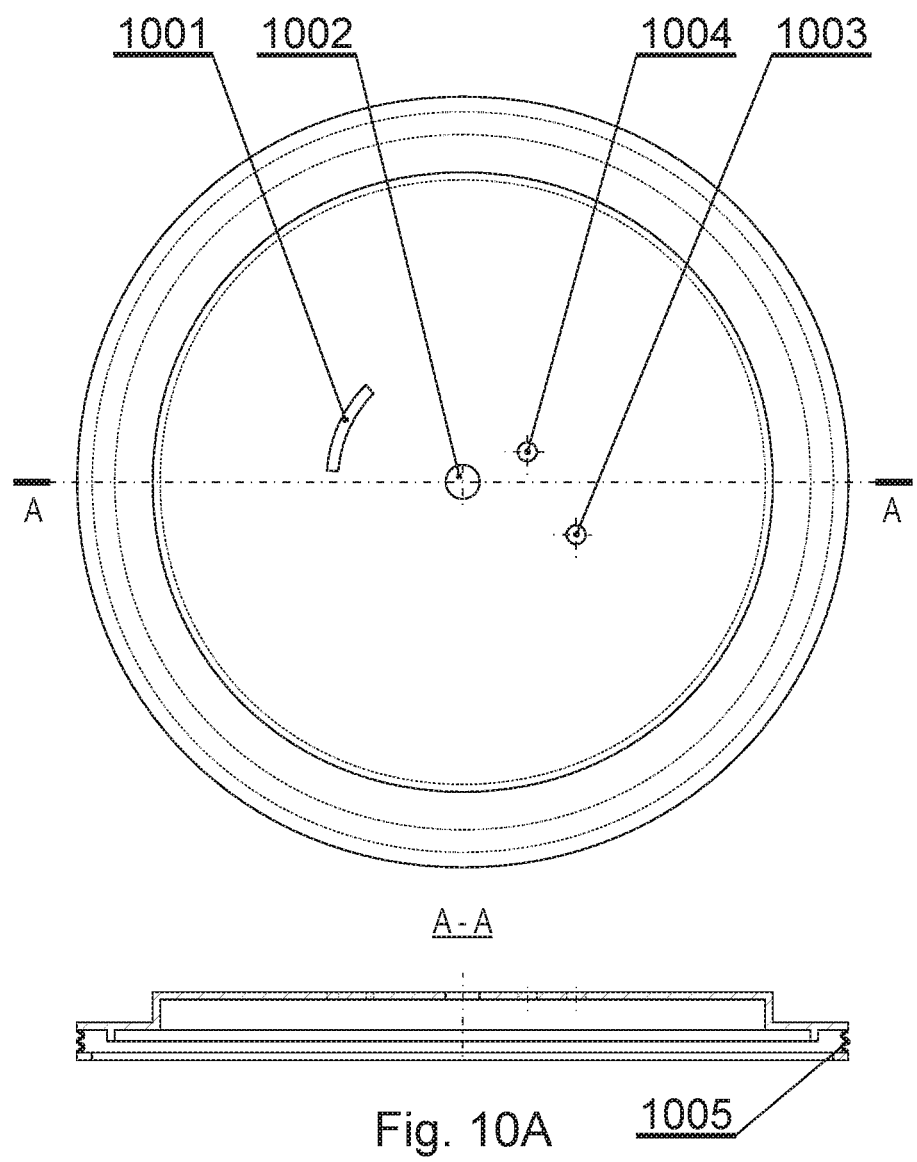
FIGS. 10A-B present an exemplary lid's (102) top portion.

FIG. 10A presents an exemplary top lid (102) portion. The lid's (102) top portion comprises an aperture (1001) a through-hole (1002) for receiving the fastening element (700), a through-hole (1003) for receiving the blocking member (411) (for example a protrusion) and lastly a through-hole (1004) for receiving the micro-switch (901).

Lastly, the lid's (102) top portion comprises a flange (1005) to be connected to a bottom lid (102) portion.

Figure 10B:
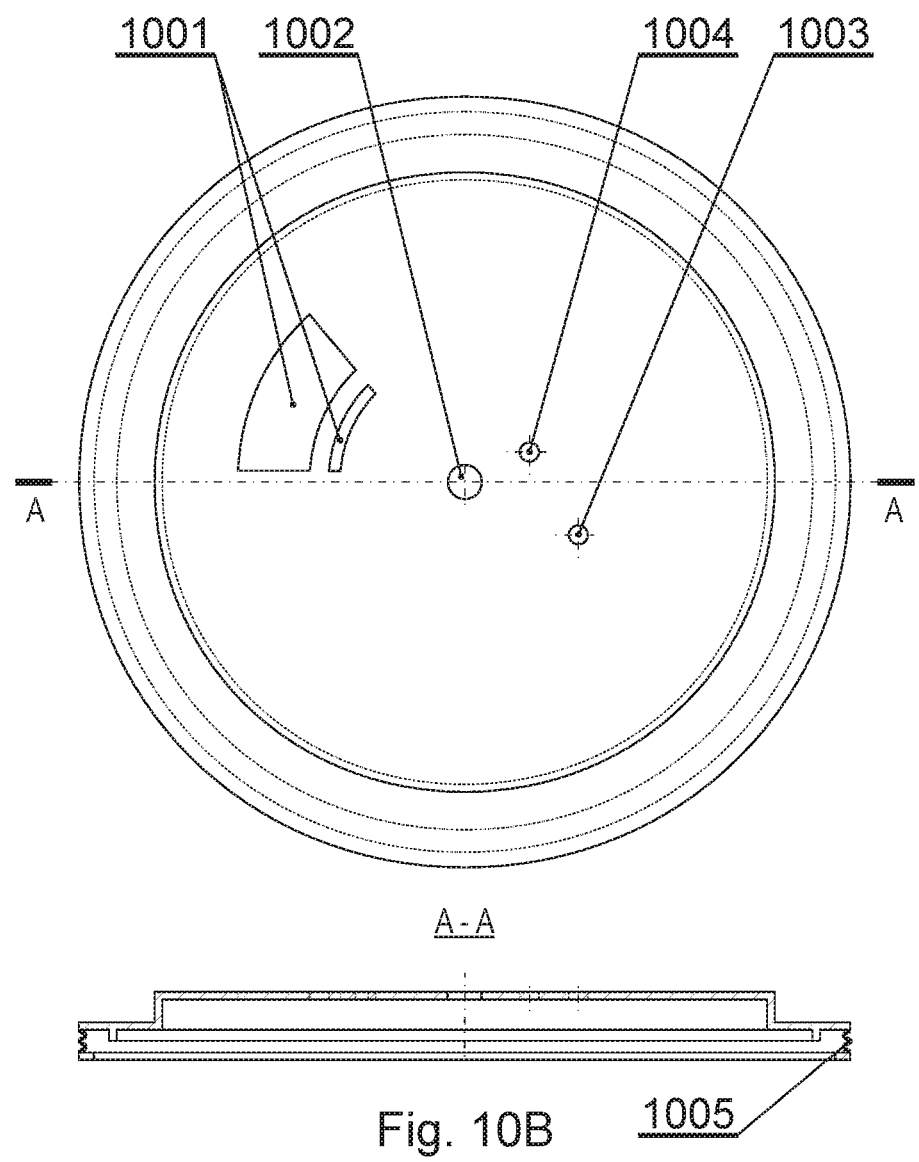

A cross-section of the top lid (102) portion has also been presented in FIG. 10A. Typically, this element will comprise a metal rim and a transparent cover, preferably made of glass. FIG. 10B is similar to FIG. 10A with a difference in the size of the aperture (1001). Naturally, the aperture (1001) may be even larger, wherein a modification of its size also requires a corresponding modification of the flange (403).

Figure 11:
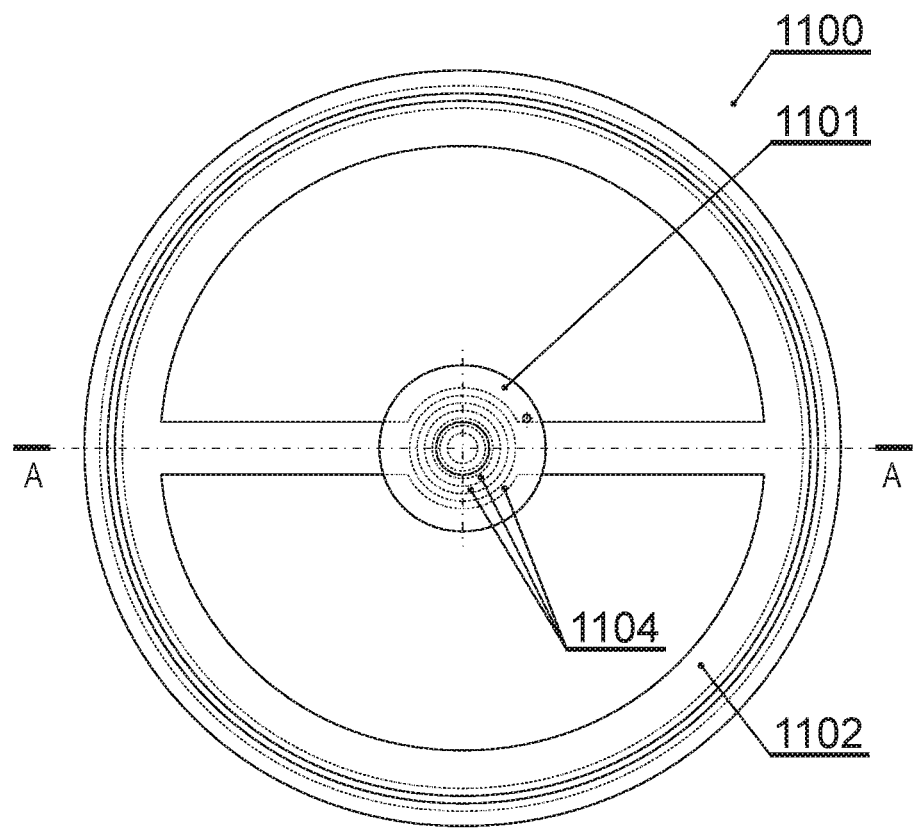
FIG. 11 presents an exemplary lid's (102) bottom portion.
Figure 11:
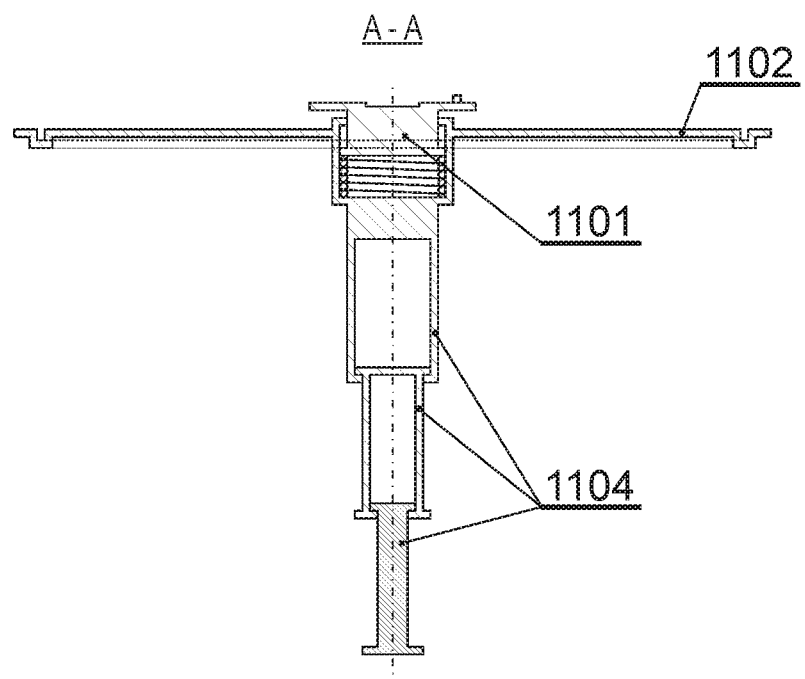

FIG. 11 depicts an exemplary bottom lid (102) portion. The bottom (1100) comprises a spring mechanism (1101) being in this case the height increasing mechanism operated by the height actuator (207). The spring mechanism (1101) is positioned on a support frame (1102), which may have different shapes as long at it may securely support the lid's (102) top portion. In this example, the support frame (1102) has an outer rim and a central spoke positioned on the diameter of the circular, outer rim.

Additionally, the lid's (102) bottom portion comprises and extensible set of sensors (202) positioned on a multi-segment support (1104) allowing the length of sensors (202) to be adjusted to a depth of a given vessel (101). This set of sensors (202) is configured to detect the level of content present in said vessel (101).

Alternatively, the sensors (202) may be provided on an elastic band adapting to the shape of the vessel (101). In such case a portion of the elastic band may rest horizontally on the bottom, inside said vessel (101), while the remaining portion is positioned vertically. Such approach is sufficient as long as a difference in content level may be detected.

To this end, the content level sensor (202) may be submersible in the vessel's content or alternatively be part of the vessel (101) and communicate by means of a wire/wireless link with the lid (proximity sensors will suffice).

A cross-section of the lid's (102) bottom portion (1100) has also been presented in FIG. 11. Typically, this element will be made of metal or heat resistant plastic material.

Figure 12:
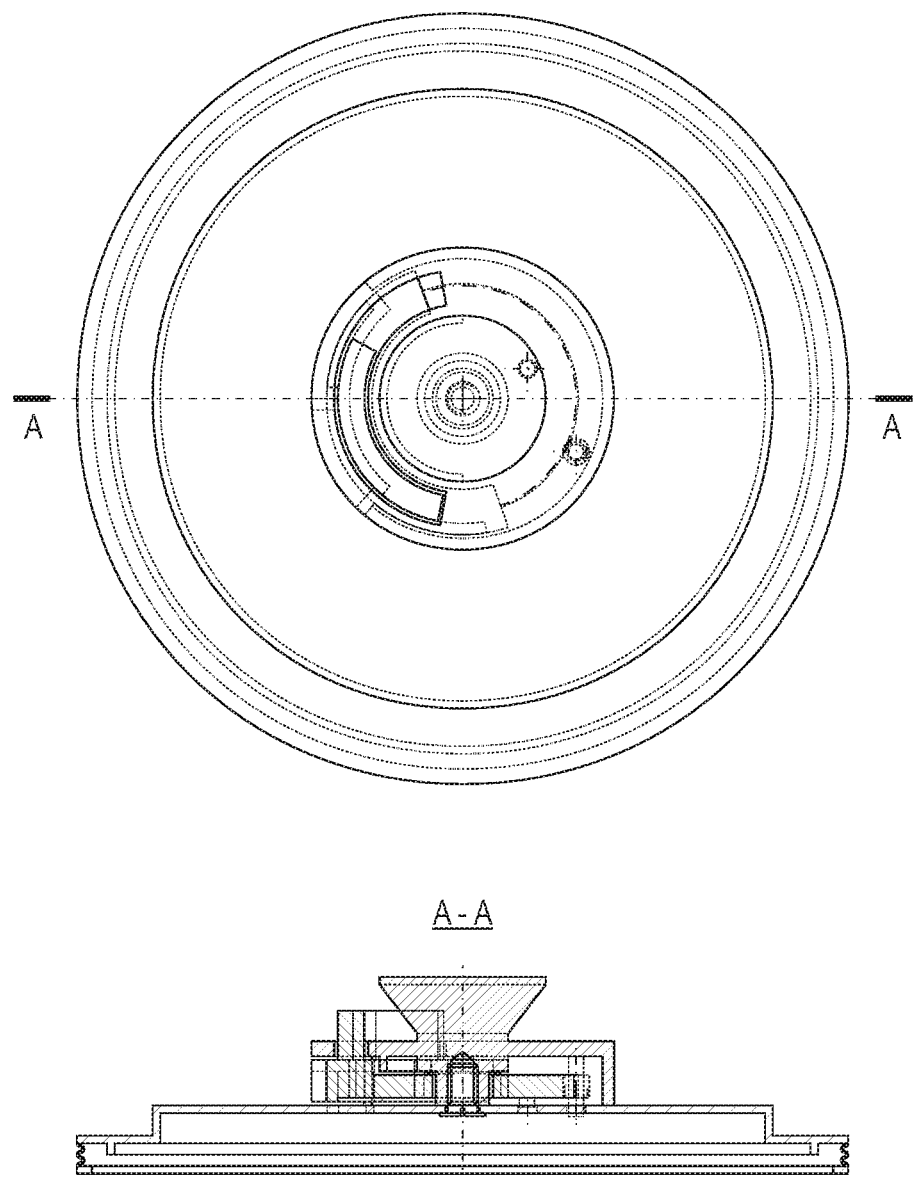
FIG. 12 presents a fully assembled lid (102) presented in details in FIGS. 4 to 11.

FIG. 12 presents a fully assembled lid (102) presented in details in FIGS. 4 to 10. It may be seen that the raising mechanism, which preferably is a motor or a spring (one or more)—in case of one spring it may be hidden beneath a lid's (102) knob (gripping element)—a small motor may be similarly positioned and powered from the power supply (205). Thus, the system is self-contained and small-sized so that it may be used as a typical lid without causing any burden on users.

Further, there is the flange (1005) between the lid's (102) bottom portion (1100) and the lid's (102) top portion, which facilitates increase of the lid's (102) height when said height actuator (207) has been invoked (306). The flange (1005) may be elastic or not depending on particular needs, but shall not let the boiling foam out.

Naturally, the flange (1005) may be higher or lower when extended, depending on the needs of particular application as well as size of the corresponding vessel (101). This will also require adjustment of the extension mechanism, for example the length of the respective spring.

Typically, the flange (1005) element will be made of metal or heat resistant plastic material.

Figure 13A:
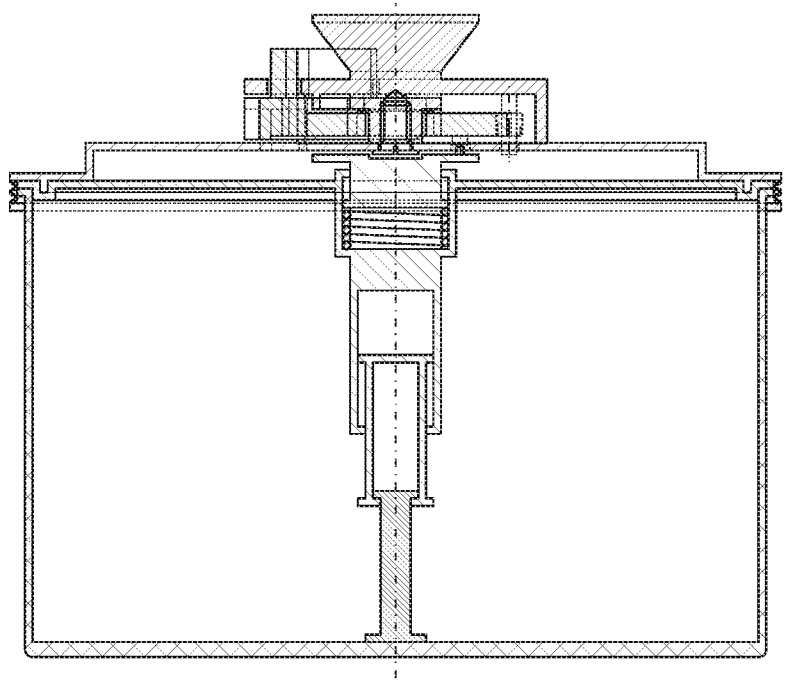
FIGS. 13A-B depict the lid (102) of FIG. 12 with added elements of FIG. 11.
Figure 13B:
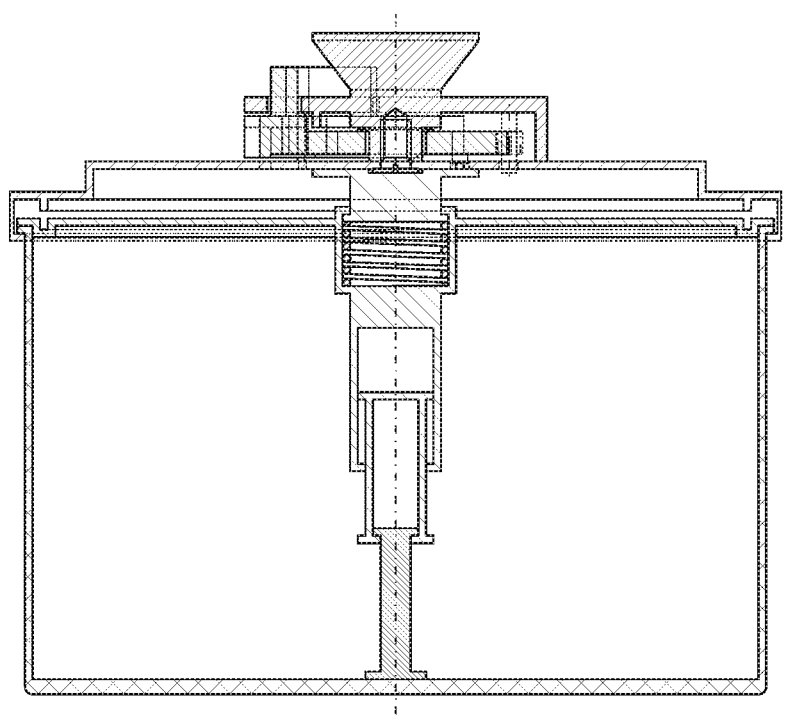
Figure 14:
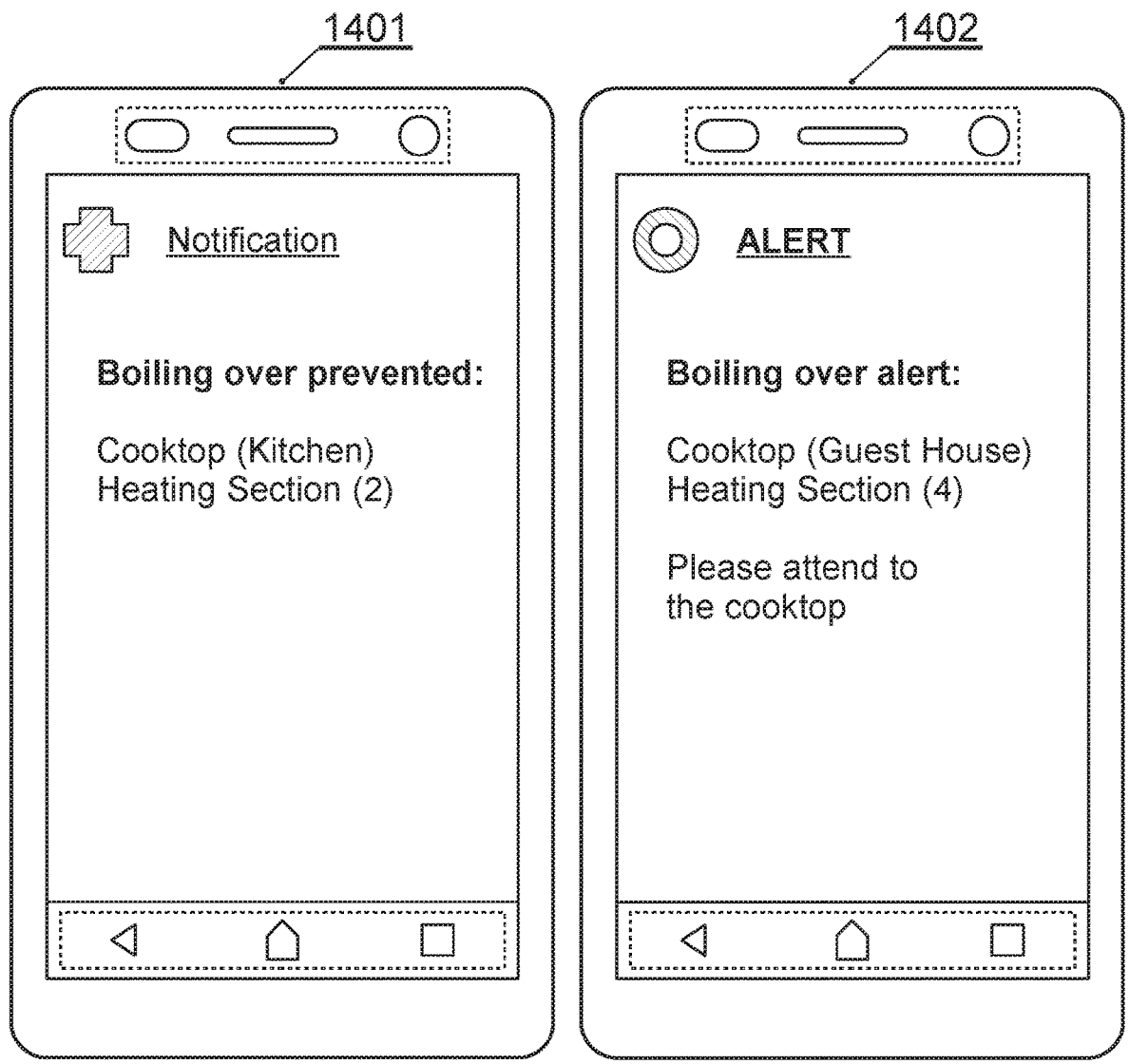
FIG. 14 shows examples of a graphical user interface of a mobile device implementing the present invention.

FIGS. 13A-B depict the lid (102) of FIG. 12 with added elements of FIG. 11. As may be seen in FIG. 13A the lid (102) has been positioned on a vessel (101) and the extensible set of sensors (202) has been positioned such that it preferably touches the bottom of the vessel (101) from the internal side. The flange (1005) is retracted in FIG. 13A while in FIG. 13B the flange (1005) is extended according to the height actuator mechanism (207). It will be evident to one skilled in the art that the size of said extension may be different and will impact the size of the additional volume in the vessel (101) including said lid 102), FIG. 14 shows examples of a graphical user interface of a mobile device implementing the present invention.

The first example (1401) presents a notification on said mobile device (104) relating to a boiling over situation being successfully prevented. Information is given on the relevant cooktop as well as heating section of this particular cooktop. Since the lid (102) has coped with the issue, a notification only is given.

In the second example (1402) an alert is given, because the lid (102) has detected boiling over. For example, a threshold has been exceeded during which the decrease threshold (309) has not been fulfilled. Information is given on the relevant cooktop as well as heating section of this particular cooktop. User's attendance is required in such case.

At least parts of the methods according to the invention may be computer implemented. Accordingly, the present invention may take the form of an entirely hardware embodiment, or an embodiment combining software and hardware aspects that may all generally be referred to herein as a "circuit", "module" or "system".

Furthermore, the present invention may take the form of a computer program product embodied in any tangible medium of expression having computer usable program code embodied in the medium.

It can be easily recognized, by one skilled in the art, that the aforementioned method for detecting a possibility of boiling over and preventing said boiling over may be performed and/or controlled by one or more computer programs. Such computer programs are typically executed by utilizing the computing resources in a computing device. Applications are stored on a non-transitory medium. An example of a non-transitory medium is a non-volatile memory, for example a flash memory while an example of a volatile memory is RAM. The computer instructions are executed by a processor. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:

1. A system for detecting a possibility of boiling over, and preventing said boiling over, of contents in a vessel having a lid, the lid having an adjustable aperture and being height-adjustable relative to the vessel, the system comprising:
- a height actuator configured to adjust the height of the lid relative to the vessel;
- an aperture actuator configured to create the aperture, and to adjust a size thereof;
- one or more sensors configured to detect a level of said contents; and
- a controller communicatively coupled to each of the one or more sensors, height actuator and aperture actuator,
- wherein the controller is configured to:
  - a) receive information from the one or more sensors on an initial level of said contents and current level of the said contents;
  - b) determine a difference between the initial level and the current level; and
  - c) based on said difference, take one or more of the following actions:
    - (i) instruct said height actuator to extend said lid vertically, thereby raising the height of said lid relative to said vessel;
    - (ii) instruct said aperture actuator to open said aperture thereby facilitating an exchange of heat;
    - (iii) communicate with a cooktop on which the vessel is situated in order to decrease power generation of a particular heating section of said cooktop on which the vessel is situated.

2. The system according to claim 1, wherein said height actuator adjusts said height of the lid by means of a spring or an electric motor.

3. The system according to claim 1, wherein said aperture actuator creates said aperture by means of a spring or an electric motor.

4. The system according to claim 1, wherein said height actuator comprises a release mechanism configured to extend a flange between a bottom portion and a top portion of said.

5. The system according to claim 1, wherein said one or more sensors is submersible in said content and mounted on an extensible, multi-segment support.

6. The system according to claim 1, wherein the action of communicating with a cooktop further comprises establishing, via a proximity identification circuit within said lid, the particular heating section.

7. The system according to claim 1, wherein said controller is configured to communicate via a communication module with a mobile device in order to report to the mobile device, information regarding whether a boiling over situation has been prevented or not.

8. The system according to claim 7, wherein said communication module operated according to the Bluetooth or ZigBee protocol.

* * * * *